T. SHAW.
Tea-Pot Handle.

No. 159,121. Patented Jan. 26, 1875.

WITNESSES.
Henry D. Axelby
Henry Clulee

INVENTOR.
Thomas Shaw

UNITED STATES PATENT OFFICE.

THOMAS SHAW, OF PROVIDENCE, RHODE ISLAND.

IMPROVEMENT IN TEA-POT HANDLES.

Specification forming part of Letters Patent No. 159,121, dated January 26, 1875; application filed October 28, 1874.

*To all whom it may concern:*

Be it known that I, THOMAS SHAW, of the city and county of Providence and State of Rhode Island, have invented a new and Improved Insulated Handle for Tea-Pots and similar purposes, of which the following is a specification, referring to the accompanying drawing making part of the same, in which—

Figure 1:
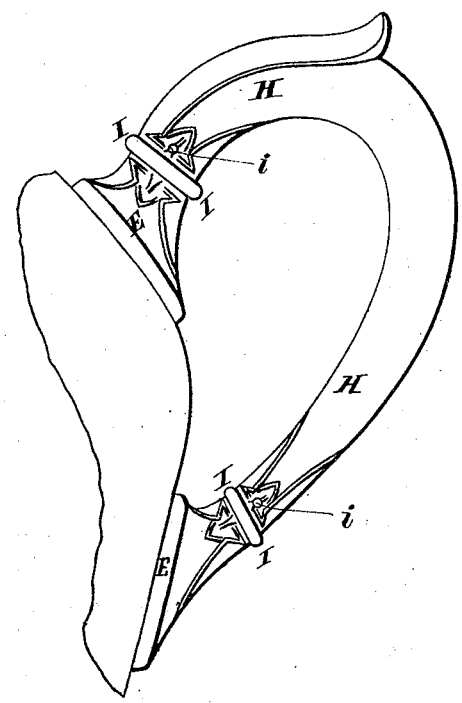
Figure 2:
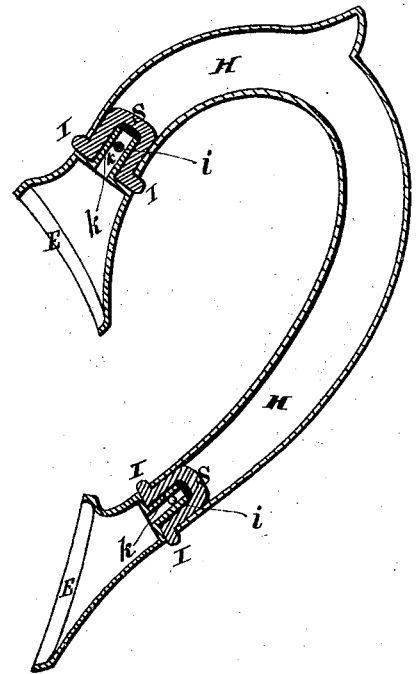
Figure 3:
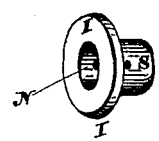

Figure 1 is an elevation of my improved handle. Fig. 2 is a vertical section of the same. Fig. 3 is a perspective view of my improved insulator.

Similar letters mark the same parts in all the figures.

My invention relates to the construction and mode of applying the insulators which are generally employed to prevent the conduction of heat from the tea-pot to its handle.

These insulators are usually made of ivory, which is the best material for the purpose, and, besides the function of a non-conductor, they also serve as a connection to unite the divisions or parts of the handle, which is of metal; and to this end the insulators are made in the form of a thin collar or disk with a shank on each side, which extends into the hollow ends of the metallic parts and are secured therein by two rivets passing through the metal and the ivory shank on each side of the collar. This construction of the insulated handle is objectionable, because its utility and permanence depend wholly upon the soundness and stability of the said ivory connection, and because this connection becomes dry by continued exposure to heat, and shrinks and splits lengthwise through the rivet-holes, and in consequence the handle becomes loose, and then comes off the tea-pot, and can only be replaced at considerable trouble and expense by a skilled workman.

The object of my invention, it will therefore be understood, is to remove the objection mentioned; and the invention consists in so constructing the insulator and the contiguous parts of the metallic handle that a connection of the metallic handle may be effected with the insulator secured between them in such a manner that the insulator shall perform the function of insulation only, and that the connection will remain unaffected by the fracture of the insulator.

In the drawing, Fig. 3 shows the form of the insulator, and Fig. 2 shows the same applied in the construction of the handle H. The insulator has the usual collar, I, and a shank, S, on one side, and a hollow cavity or socket, N, on the other side. The shank S extends into the hollow ends of the handle H, and the hollow cavity N receives the metallic shank k, which extends from the two bases E E of the handle on the tea-pot F. The metallic shank k extends into the interior of the ivory insulator from one side of its collar I, and the hollow end of the handle extends over the outside of the insulator-shank on the other side of its said collar, so that the handle end and the shank k may be fastened together by a single rivet, i, passing through both from side to side and the insulator between them, as shown in Fig. 2.

By means of this construction it will be seen that the metallic parts of the handle are riveted together with the insulators interposed between the same, and that the insulator forms no part of the connection of the metallic parts, and in case it should be fractured or split from any cause the riveted connection of the handle is unaffected by the circumstance.

Besides the above advantage of a more permanent and better connection of the parts, the insulators may be constructed, as described, from nearly one-half the quantity of ivory heretofore required, which, considering the high cost and increasing scarcity of the material, is a very important consideration in the way of cheapening the article.

Besides the article of tea-pot handles above referred to, the improved insulator is applicable to faucets for tea and coffee urns, and for other purposes of a like nature, and in some instances when an insulator, from the peculiarities of its construction, could not be used before.

Having described my invention, I claim—

The insulator composed of a collar, I, shank S, and hollow cavity or socket N, in combination with a metallic shank, k, and handle ends of the handle H, in the manner specified, so that the whole may be connected in the manner substantially as described.

THOMAS SHAW.

Witnesses:
HENRY AXELBY,
HENRY CLULEE.